(12) United States Patent
Lin

(10) Patent No.: US 10,018,217 B2
(45) Date of Patent: Jul. 10, 2018

(54) SYSTEMS FOR USING A RELEASABLE ADHESIVE IN SUCTION

(71) Applicant: GM Global Technology Operations LLC, Detroit, MI (US)

(72) Inventor: Yhu-tin Lin, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 155 days.

(21) Appl. No.: 14/938,774

(22) Filed: Nov. 11, 2015

(65) Prior Publication Data

US 2016/0136940 A1    May 19, 2016

Related U.S. Application Data

(60) Provisional application No. 62/079,351, filed on Nov. 13, 2014.

(51) Int. Cl.
*B32B 38/10* (2006.01)
*F16B 47/00* (2006.01)

(52) U.S. Cl.
CPC .................. *F16B 47/003* (2013.01)

(58) Field of Classification Search
CPC ........ F16B 47/003; F16B 47/00; B32B 38/10; B32B 37/12; B32B 37/10
See application file for complete search history.

(56) References Cited

U.S. PATENT DOCUMENTS

| 8,685,528 B2 | 4/2014 | Xie et al. |
| 2014/0069578 A1 | 3/2014 | Xie et al. |

FOREIGN PATENT DOCUMENTS

| GB | 2337074 A | * 11/1999 | ............ F16B 47/00 |
| JP | 2001-226657 | 8/2001 | |

OTHER PUBLICATIONS

Chinese Office Action dated Apr. 27, 2017 for Chinese Patent Application No. 201511035874.1.

* cited by examiner

*Primary Examiner* — Vishal I Patel
(74) *Attorney, Agent, or Firm* — Cynthia R. Parks; Parks IP Law LLC

(57) ABSTRACT

A releasable adhesive system, for securing a suction device to an attaching surface. The releasable adhesive comprises a primary material having a first portion including at least one first-portion molecule that is configured to be positioned parallel with at least one molecule of the attaching surface, and a second portion, opposite the first portion, that is configured to permanently attach to an interior surface of the suction device. The first-portion molecule positioned parallel with the molecule of the attaching surface is configured to maintain a bond between the first portion and the attaching surface up to one or more pre-determined forces on the attaching surface, such as a pre-determined shear force, pull force, and peel force.

20 Claims, 6 Drawing Sheets

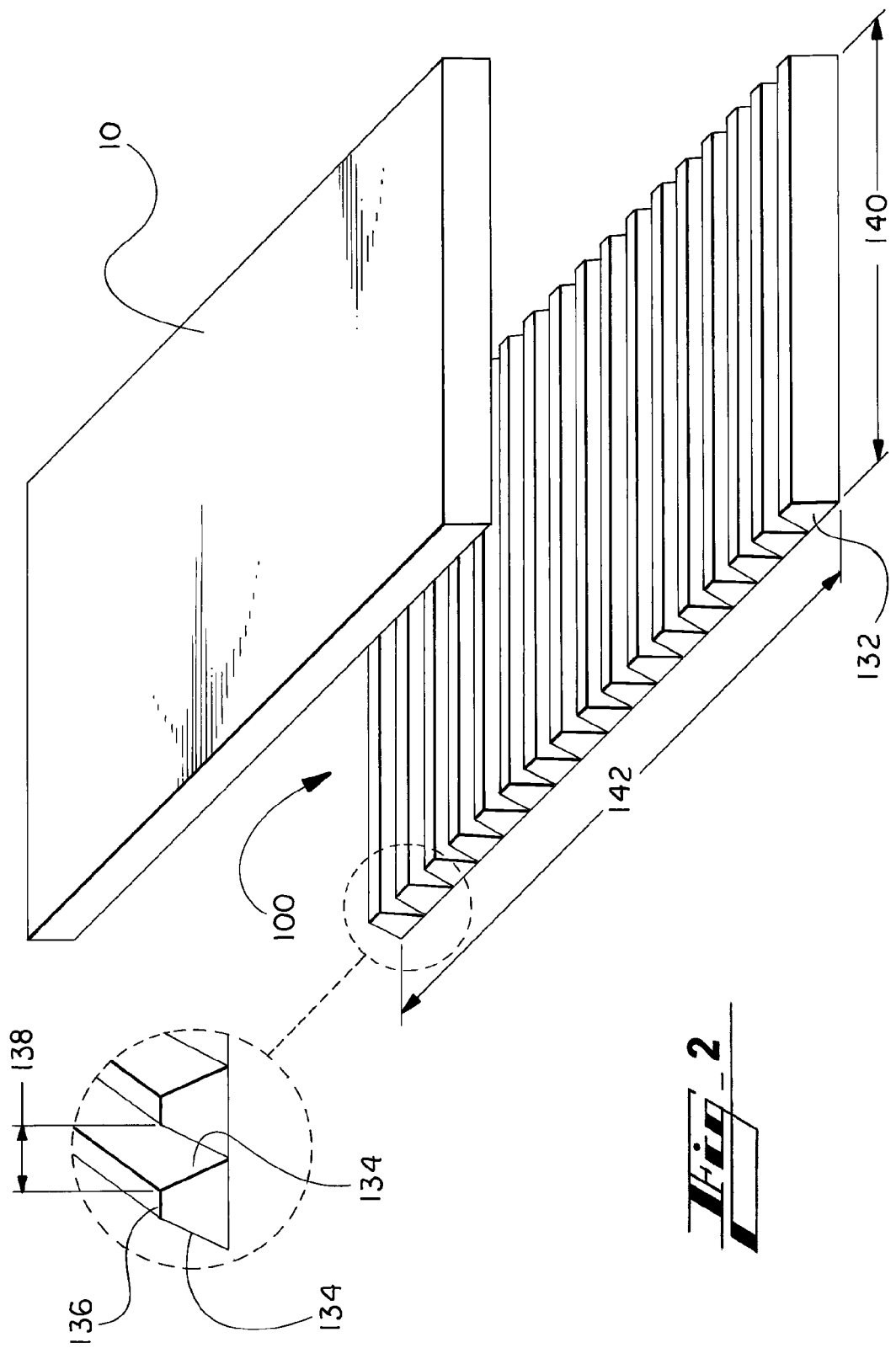

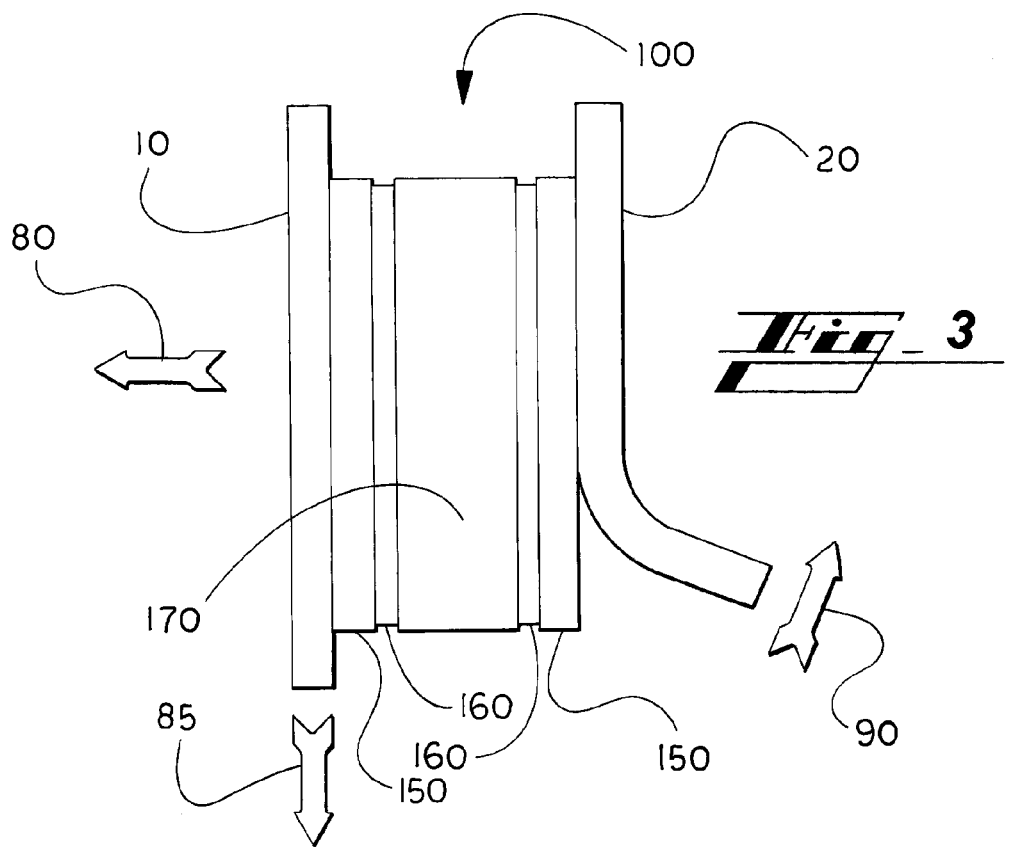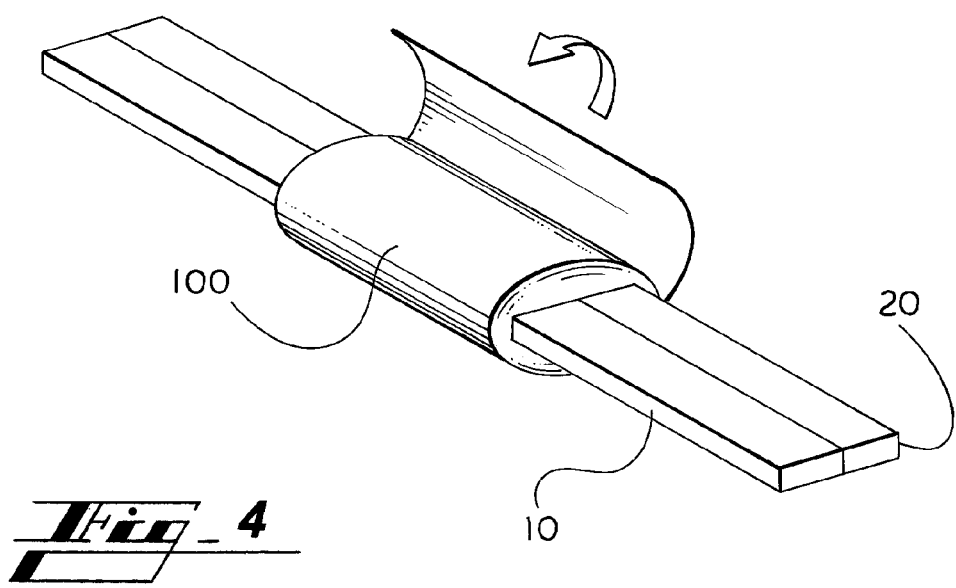

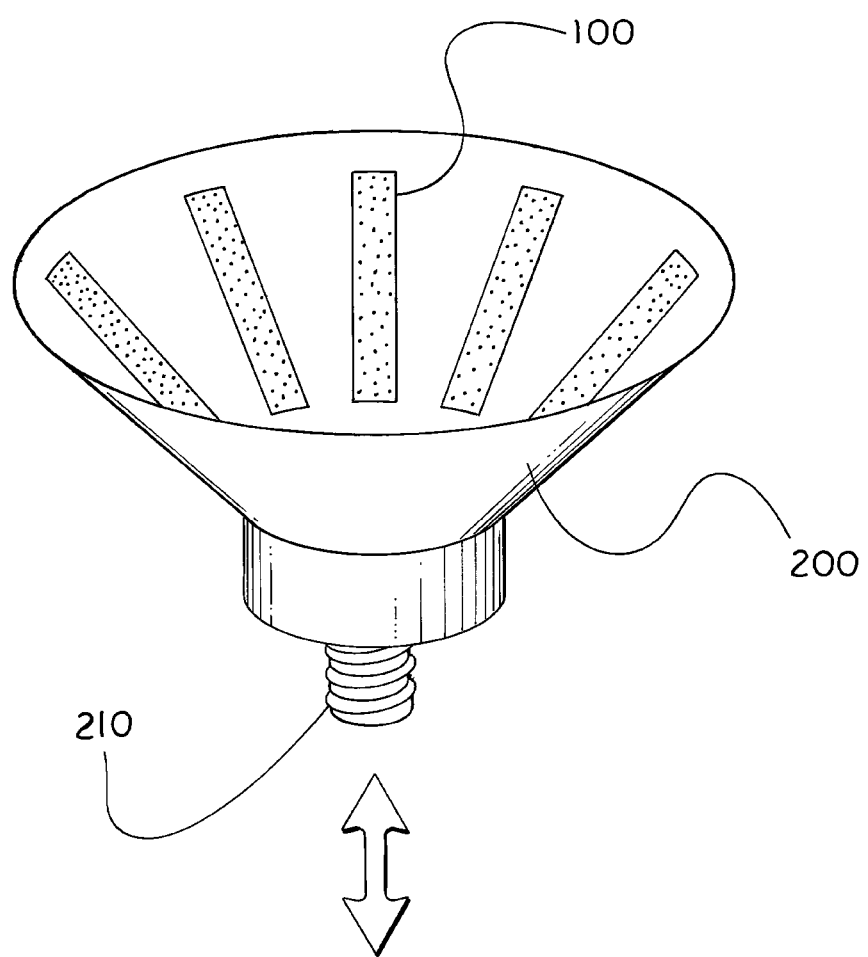
Fig_5

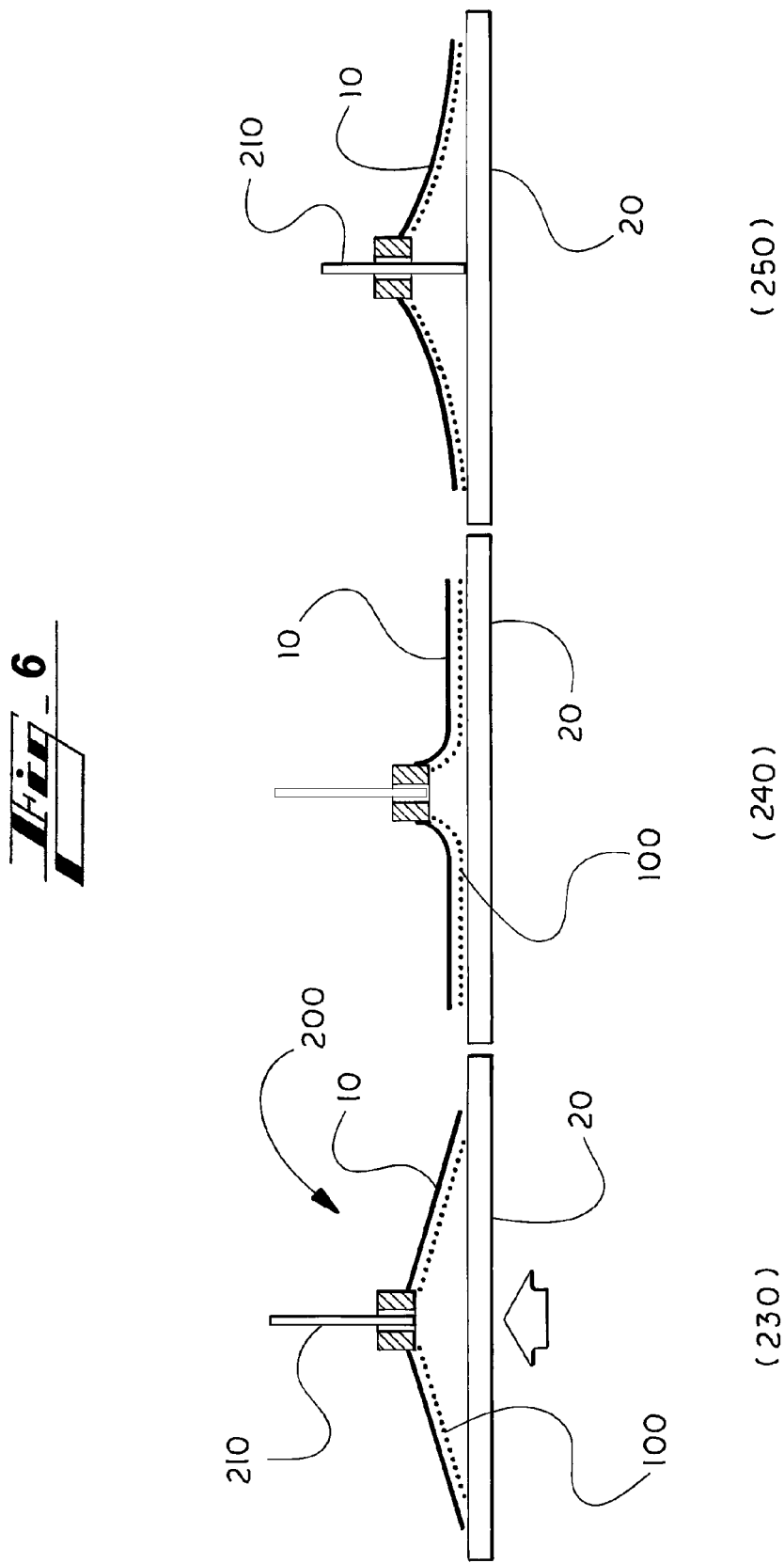

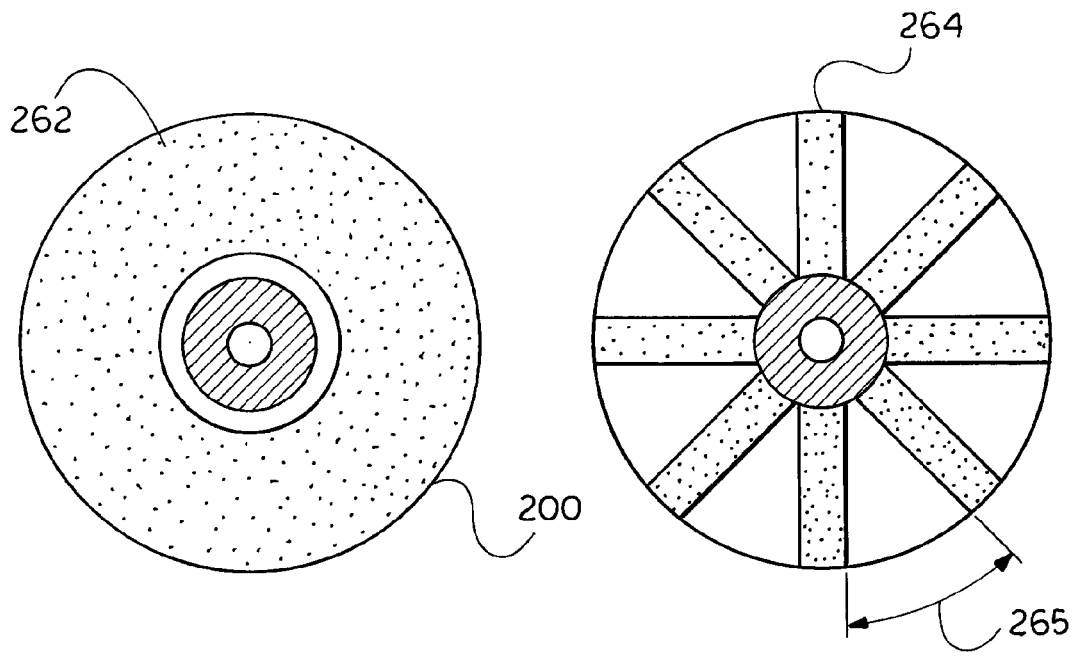
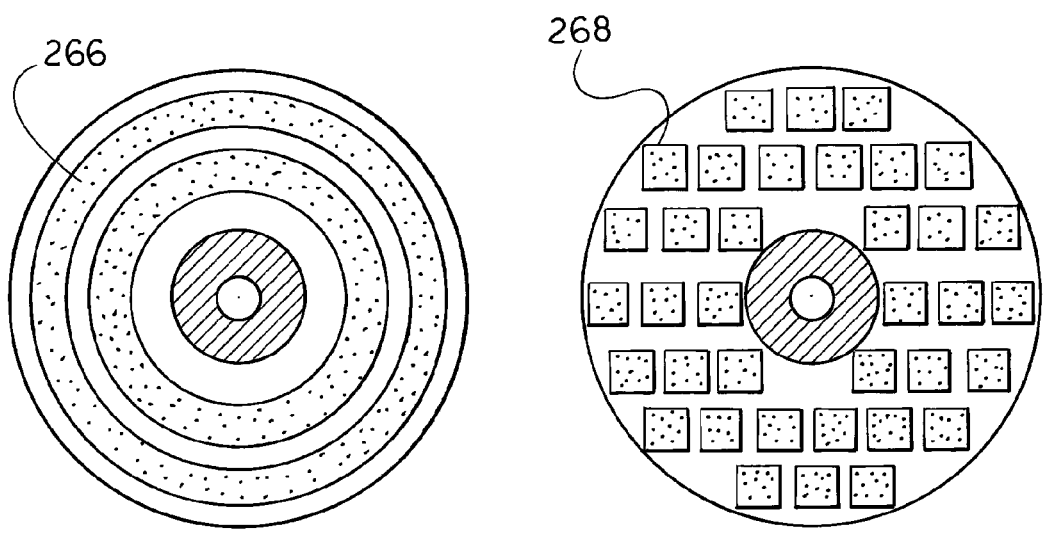
Fig_7

SYSTEMS FOR USING A RELEASABLE ADHESIVE IN SUCTION

CLAIM OF PRIORITY

This application claims the benefit of U.S. Provisional Application No. 62/079,351, filed Nov. 13, 2014,

TECHNICAL FIELD

The present disclosure relates generally to systems and method for temporarily or permanently joining two surfaces. More specifically, the present disclosure relates to systems and methods for temporarily or permanently joining two surfaces using a releasable adhesive.

BACKGROUND

Reversible joining processes can be used to temporarily join materials or components. Suction connections are commonly used to join surfaces temporarily in material handling through the use of manual or vacuum-operated suction.

Although suction connections are reversible in nature, the bond formed can be weakened by impurities on any of the relevant surfaces, which can lead to diminished bonding in the suction-based connection. For example, oil or dirt on a surface of a part being joined, to a suction cup, can substantially weaken the bond formed at the joining surfaces. Diminished bonding can be of particular issue where the part being joined is subjected to high-speed attachment to the suction connection.

Additionally, some suction connections require a constant vacuum connection to maintain the temporary bond, especially where the part being joined includes surface texture or a complex geometry. However, the suction connection that uses a constant vacuum may prematurely disconnect from the part being joined in the event of a power failure, for example of the vacuum.

SUMMARY

A need exists for a suction system reversible in nature, or releasable, after installation. The suction system adhesive would have load-carrying capabilities when attached to a surface, and be able to release quickly to disjoin from the surface upon a pre-determined amount of peel force.

The present technology relates to systems including a releasable adhesive having many applications including in commercial industry, the private-sector (e.g., consumer), and manufacturing, among others. The releasable adhesive forms a reversible bond that utilizes van der Waals force to adhere to a surface.

The releasable adhesive releasable adhesive comprises a primary material having a first portion including at least one first-portion molecule that is configured to be positioned parallel with at least one molecule of the attaching surface, and a second portion, opposite the first portion, that is configured to permanently attach to an interior surface of the suction device. The at least one first-portion molecule positioned parallel with the molecule of the attaching surface is configured to (a) maintain a bond between the first portion and the attaching surface up to a pre-determined shear force being exerted on the attaching surface, (b) maintain a bond between the first portion and the attaching surface up to a pull force of a pre-determined amount being exerted on the attaching surface, and/or (c) release the bond between the first portion and the first, attaching surface in response to a peel force exerted on the attaching surface above a pre-determined amount. In some embodiments, a plurality of first-molecules contact a plurality of molecules in the attaching surface during operation of the releasable adhesive system (e.g., when the suction device is engaged).

In some embodiments, the primary material is shaped into a plurality of components each having the first portion configured to be positioned parallel with at least one molecule of the attaching surface and the second portion configured to permanently attach to the suction device. In some embodiments, each of the plurality of components is positioned at a location and extend in a direction outward from the location, forming a plurality of radii from the location. Each of the plurality of radii may be positioned at an angle with a preceding radius and a succeeding radius. In some embodiments the plurality of components are shaped to allow concentric positioning of each of the plurality of components with respect to one another.

Also provided is method for using the suction device on the attaching surface, wherein the suction device contains the releasable adhesive. The method comprises positioning the suction device approximately near an attaching surface engaging the first portion with the attaching surface using a securing device, wherein at least a portion of the suction device is approximately flat against the attaching surface.

In some embodiments, the engaging occurs by at least temporarily attaching a securing device to an exterior surface of the suction device. Air between the interior surface of the suction device and the attaching surface can be at least partially removed using the securing device. The securing device may be a vacuum.

In some embodiments, the method further comprises, releasing the bond between the first portion and the attaching surface using the peel force. In some embodiments, the releasing occurs by introducing air into the inner surface of the suction device. Releasing can occur by exerting a force eon a securing device in contact with the attaching surface such that the suction device is released from the attaching surface. The securing device may be compressed air provided by a vacuum line.

Other aspects of the present technology are described hereinafter.

DESCRIPTION OF THE DRAWINGS

FIG. 2 is a perspective view of an alternative embodiment of the removable adhesive of

FIG. 1.

FIG. 3 is a side view of a second alternative embodiment of the removable adhesive of FIG. 1.

FIG. 4 is a perspective view of a third alternative embodiment of the removable adhesive of FIG. 1.

FIG. 5 illustrates a perspective view of a suction application of the removable adhesive of FIG. 1.

FIG. 6 illustrates a process for using the releasable adhesive in the suction application of FIG. 5.

FIG. 7 illustrates at top view of patterns of the releasable adhesive used by the suction application of FIG. 5.

Figure 1:
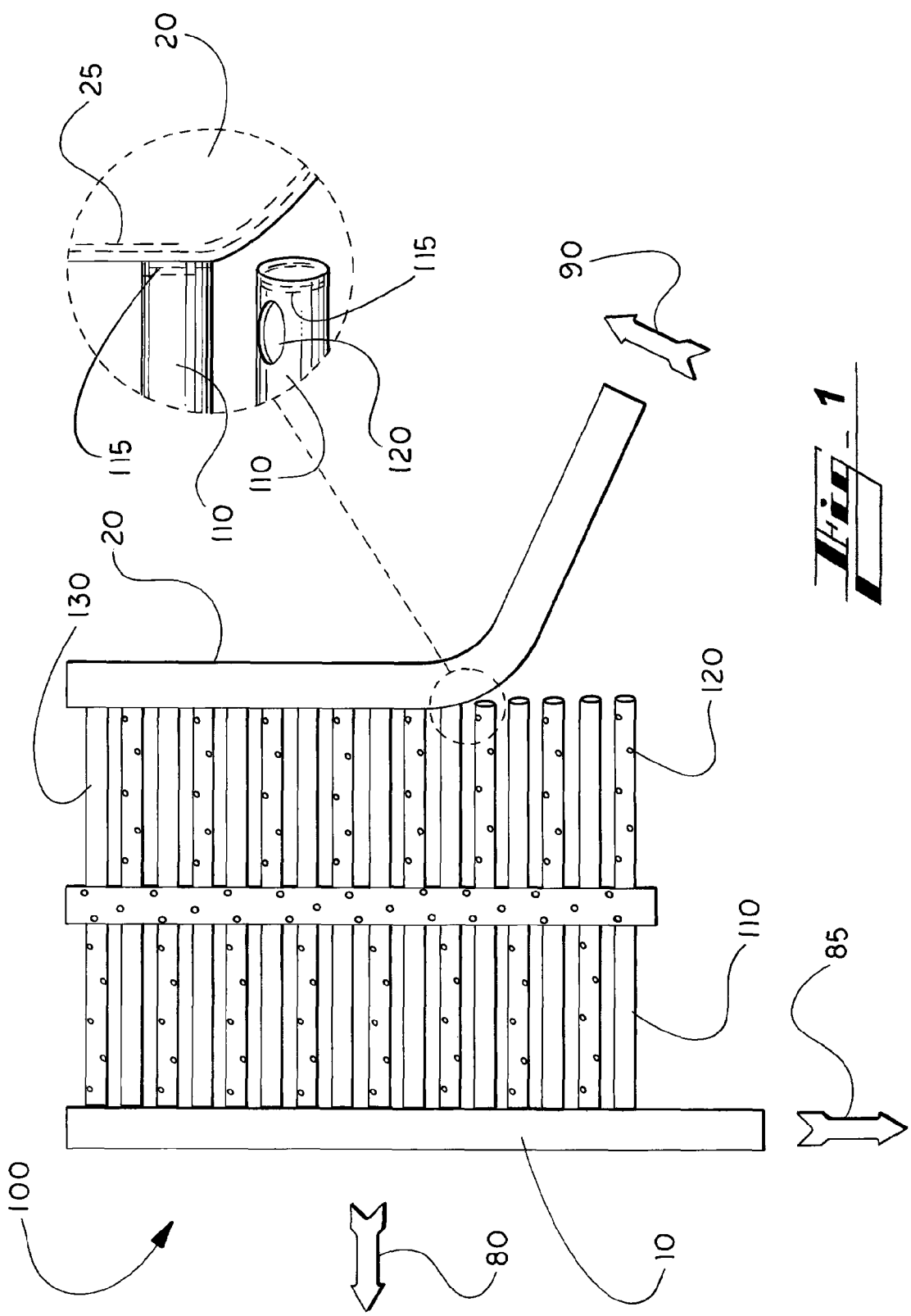
FIG. 1 illustrates a side view of a removable adhesive in accordance with an embodiment of the present technology.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

While the present technology is described primarily herein in connection with automobiles, the technology is not limited to automobiles. The concepts can be used in a wide variety of vehicle applications, such as in connection with aircraft, marine craft, and other vehicles, and consumer electronic components. Additionally, the concepts can be used in a variety of consumer applications, such as electronic components, clothing design (e.g., fasteners and closures), apparel gripping (e.g., work gloves and sports gloves), and signs (e.g., permanent signage for a business and temporary signage for a traffic detour), among others. Furthermore, the concepts can be used in low temperature environments (e.g., aeronautical applications in space) where conventional adhesives lose gripping.

Various embodiments of the present disclosure are disclosed herein. The disclosed embodiments are merely examples that may be embodied in various and alternative forms, and combinations thereof.

I. Overview of the Disclosure

FIG. 1 illustrates a releasable adhesive 100, which allows reversible bonding through the use of van der Waals force. The releasable adhesive 100 adheres and releases from a first surface 10 and a second surface 20 where surface 10, 20 are substantially solid surfaces made of varying materials and textures of the surfaces 10, 20.

The releasable adhesive 100 comprises a primary material 110 that has particles (e.g., molecules, atoms, ions) generally parallel with respect to particles within the first surface 10, the second surface 20. As seen in the callout of FIG. 1, molecules 115 of the primary material 110 are parallel with molecules 25 of the second surface 20, at a location of attachment. Van der Waals force allows the molecules 115 of the primary material 110 to adhere to the second surface 20. Specifically, the molecules 115 of the primary material 110 maintain a bond between the releasable adhesive 100 and an attaching surface (e.g., the second surface 20) against pull forces 80 and shear forces 85.

Unlike a traditional chemical bonding process required by typical adhesives, the releasable adhesive 100 does not require curing, thus allowing the releasable adhesive 100 to adhere to the surfaces 10, 20 almost instantaneously. The releasable adhesive 100 can also adhere to the surface 10, 20 without use of an external power supply, actuator, or otherwise.

Van der Waals force also allows the bond between the molecules 115 of the primary material 110 and the molecules of the attaching surface (e.g., the molecules 25 of the second surface 20) to detach when peel forces 90 are applied to the surfaces attaching surface or the releasable adhesive 100. As seen in the callout of FIG. 1, where the primary material 110 is not in contact with to the second surface 20, the molecules 115 of the primary material 110 are not generally parallel to the molecules 25 of the second surface 20.

In some embodiments, the primary material 110 includes a microstructured and/or a nanostructured polymer, such as silicone and polydimethylsiloxane (PDMS), among others. In some embodiments, the primary material 110 includes polymers such as (functionalized) polycarbonate, polyolefin (e.g., polyethylene and polypropylene), polyamide (e.g., nylons), polyacrylate, acrylonitrile butadiene styrene.

In some embodiments, the primary material 110 includes composites such as reinforced plastics where the plastics may include any of the exemplary polymers listed above, and the reinforcement may include one or more of the following: clay, glass, carbon, polymer in the form of particulate, fibers (e.g., nano, short, or long fibers), platelets (e.g., nano-sized or micron-sized platelets), and whiskers, among others.

The primary material 110 can include synthetic or inorganic, molecules. While use of so-called biopolymers (or, green polymers) is becoming popular in many industries, petroleum based polymers are still much more common in every-day use. The primary material 110 may also include recycled material, such as a polybutylene terephthalate (PBT) polymer, being, e.g., about eighty-five percent post-consumer polyethylene terephthalate (PET). In one embodiment, the primary material 110 includes some sort of plastic. In one embodiment, the material includes a thermoplastic.

In one embodiment the primary material 110 includes a composite. For example, the primary material 110 can include a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite (e.g., plastic composite containing metal reinforcing fibers). The primary material 110 in some implementations includes a polyamide-grade polymer, which can be referred to generally as a polyamide. In one embodiment, the primary material 110 includes acrylonitrile-butadiene-styrene (ABS). In one embodiment, the primary material 110 includes a polycarbonate (PC). The primary material 110 may also comprise a type of resin. Example resins include a fiberglass reinforced polypropylene (PP) resin, a PC/PBT resin, and a PC/ABS resin.

II. Embodiments of the Releasable Adhesive

In the embodiment shown in FIG. 1, the releasable adhesive 100 comprises a plurality of setae 130 (e.g., synthetic setae). Van der Waals force allows the primary material 110 within/on each setae 130 to adhere and release to the surfaces 10, 20 using attractions and repulsions between particles (e.g., atoms, molecules, ions) of the primary material 110 and the surfaces 10, 20.

As described above, van der Waals force allows the molecules 115 of the primary material 110 to attach and detach from the molecules of the attaching surface (e.g., the molecules 25 of the second surface 20), depending on the orientation of the molecules 115 of the primary material 110 and the molecules of the attaching surface. Specifically, the van der Waals force allows the primary material 110 within or on the setae 130 to attach to and peel away from the surfaces 10, 20 to reverse (release) the bond formed between the primary material 110 within/on the setae 130 and the surfaces 10, 20.

Impurities on or in the surfaces 10, 20, such as dirt, oil, and air pockets, do not substantially weaken the overall bond formed by the releasable adhesive 100 because of the many areas of contact between the setae 130 and the surface 10, 20. Specifically, the setae 130 form a plurality of independent bonds with the surface 10, 20, which allows the releasable adhesive 100 to bond even with the existence of some impurities affecting the bond at one or more limited points of interface.

The releasable adhesive 100, including each setae 130, may be designed to have a pre-determined of load-bearing capability. For example, where a load to be bore is from a small object under tension loading, the load bearing capability of the releasable adhesive 100 may be between about 0.05 kilograms of force per square centimeter (kg/cm$^2$) and about 1.0 kg/cm$^2$, wherein the area measurement (cm$^2$) is the surface area of the primary material 110 within/on each setae 130. However, where the object is under shear loading, the load bearing capability of the releasable adhesive 100 may be between about 1.0 and about 20 kg/cm$^2$.

In some embodiments, as also shown in FIG. 1, the primary material 110 is infused with an embedded material 120. In some embodiments, the embedded material 120 is a material being similar in composition (e.g., material composition or chemical composition) to the primary material 110. In other embodiments, the embedded material 120 is a material different than the primary material 110.

The embedded material 120 can include particles or pathways infused into a molecular structure of the primary material 110. The embedded material 120 may be infused into each of the setae 130 within the primary material 110. Alternatively, the embedded material 120 may be infused into selected setae 130, shown in FIG. 1.

In some embodiments, the embedded material 120 is selected to reinforce strength of the primary material. Reinforcing strength of the primary material allows the primary material to sustain against greater shear forces and pull forces.

In some embodiments, the embedded material 120 may be used to increase electrical and/or thermal conductivity of the primary material 110. For example, doping (e.g., vary placement any numbering of electrons and holes within a molecular structure) can be used to increase conductivity of the primary material 110. Increasing conductivity of the primary material, and thus releasable adhesive 100, may be important in applications where the surfaces 10, 20 need to conduct electricity. For example, doping of the primary material 110 may be suitable in an application where the releasable adhesive 100 serves as a conductor within a battery application.

The embedded material 120 can include a conductive fillers such as, but not limited to, carbon nanotubes, carbon black, metal nanoparticles (e.g., copper, silver, and gold), or combination thereof.

In another embodiment, seen in FIG. 2, the setae 130 are formed into an array of truncated prisms 132. Each truncated prism includes at least one side 134 and at top 136 (seen in the callout of FIG. 1), which serve as flat, generally flat, or smooth surfaces to maximize contact with an attaching surface (e.g., the first surface 10). The van der Waals force that can be exerted on the attaching surface is higher with greater contact area, and so maximizing contact with the attaching surface is a priority in design of the adhesive 100.

In some embodiments the truncated prisms can vary in geometric shape. For example, as seen in FIG. 2, the array of truncated prisms can be formed in the shape of a truncated pyramid, where each pyramid includes two sides 134 and top 136 that are used to generate sufficient van der Waals force for adhesion with the surfaces 10, 20. However, the array of truncated prisms can be in the form of a truncated cone (e.g., sloping or frustro-conical surface), where the side 134 extends around a circumference of a circular base.

Impurities on or in the surfaces 10, 20, such as dirt, oil, and air pockets, do not lead to a substantial weaken the overall bond because of the many areas of contact between the truncated prisms 132 and the surface 10, 20. Specifically, the truncated prisms 132 form a plurality of independent bonds with the surface 10, 20, which allows the releasable adhesive 100 to bond even with the existence of some impurities affecting the bond at one or more limited points of interface.

The array of truncated prisms 132 are extended across a defined width 140. The width 140 can range approximately between 1 millimeter (mm) and 20 mm. The truncated prisms repeat along a defined length 142 with a range similar to the width 140. Spacing between each prism 132 should be sufficient to allow contact to a surface (e.g., the first surface 10). For example, a space 138 between one edges of a first prism 132 and a subsequent prism 132 may be between 10 nanometers (nm) and 200 micrometers (μm—).

In some embodiments, the truncated prisms 132 may include the embedded material 120. The embedded material 120 may be added (e.g., doped) into the microstructure of truncated prisms 132.

In another embodiment, seen in FIG. 3 the releasable adhesive 100 may include a plurality of layers including an adhesion pad 150, a skin 160, and a tendon 170. Collectively, the plurality of layers maximize areas of contact with the surfaces 10, 20 while maintaining stiffness a direction of applied loads (e.g., along the fibers of the fabric of the skin 160).

In this embodiment, the adhesion pad 150 (e.g., a polymer elastomer) attaches to the skin 160 (e.g., woven fabric) which is attached to a tendon (e.g., woven fabric). Attaching the adhesion pad 150 to the skin 160 and the tendon 170 provides strength enabling adhesion to maintain against shear force 85 and pull force 80. An example in FIG. 3 illustrates how the first surface 10 is maintained against shear forces 85 and pull forces 80 through stiffness of fabric (e.g., fibers) within the releasable adhesive 100.

Additionally, the plurality of layers provide stiffness in a direction of peel loading (e.g., peel force 90), thus enabling release from the attached surface (e.g., the second surface 20 as seen in FIG. 3).

The adhesion pad 150 may include materials that behave elastically within a pre-determined force capacity range of a desired application. The materials should ensure deformation losses (e.g., viscoelastie, plastic, or fracture) in the materials of the adhesion pad 150 are minimized or otherwise reduced. The adhesion pad 150 may include materials such as, but not limited to, silicone, PDMS, and the like. The adhesion pad 150 may have a thickness between 10 nm and 100 nm.

The skin 160 may include similar elastic materials that minimize deformation losses as described in association with the adhesion pad 150. The skin 160 may include woven fabric materials such as carbon fiber fabric, fiber glass, KEVLAR® (KEVLAR is a registered trademark of E. I. du Pont de Nemours and Company of Wilmington, Del.), and the like. The skin 160 may have a thickness between 10 nm and 1 mm.

The tendon 170 may include woven fabric materials with high stiffness fibers such as glass fiber, nylon, and carbon-fiber, among others. The tendon 170 should be of a thickness that sufficient attaches the pad 150 to the skin 160. For example, the tendon 170 can have a length between 1 mm and 100 mm.

The connection between the tendon 170 and the adhesion pad 150 may have pre-defined dimensions, orientation, and spatial location according to particular a desired application. The pre-defined dimension can be altered to balance shear and normal loading requirements for the desired application.

In electrically conductive applications, the pad 150 can be doped with the embedded material 120. For example, the embedded material 120 can include metal nanoparticles as stated above. In some embodiments, the skin 160 and/or the tendon 170 can also be doped electrically conductive materials (e.g., carbon fiber fabric).

Where the tendon 170 attaches to the pad 150 can affect functionality of the releasable adhesive 100. Characteristics such as thickness of the tendon 170, material composition of the tendon 170, and positioning of tendon 170 with respect to the pad 150 can be set in various ways to achieve different results for desired performance in various applications. For example, positioning of the tendon 170 can affecting hanging ability. Attaching the tendon 170 at an edge of pad 150 allows increase strength of the releasable adhesive 100 in the shear direction, as seen in FIG. 3. However, attaching the tendon 170 on an inner surface of the pad 150 allows increased strength of the releasable adhesive 100 in the pull direction.

In another embodiment, seen in FIG. 4 the releasable adhesive 100 (e.g., setae 130, the prisms 132) may be formed as a flexible structure that can be molded to surround or otherwise connect surfaces. For example, the releasable adhesive 100 may function similar to single-sided tape.

In some embodiments, the releasable adhesive 100 can be included on one more than one surface for purposes of adhesion. For example, the releasable adhesive 100 may function as a double-sided tape.

The single-sided or double-sided tape may be used to position between, pinch together, wrap around, or otherwise hold together the surfaces 10, 20.

The single-sided or double-sided tape may utilize the releasable adhesive 100 in a non-conductive form or with conductive doping, using the embedded material 120. For example, the releasable adhesive 100 may be in the form of a conductive, single-sided tape, which may be used to secure the surfaces 10, 20 to one another and pass electrical currents through one another and the single-sided tape, as seen in FIG. 4.

III. Releasable Adhesive Application

FIG. 5 illustrates use of the releasable adhesive 100 in a suction-connection application. A single-sided form of the releasable adhesive 100 may be used to bond a suction cup 200 to a surface using a securing device 210. In suction applications, the first surface 10 is an inside surface of the suction cup 200 affixed to (e.g., using a conventional permanent adhesive) a non-adhesive side of the releasable adhesive 100, and the second surface 20 is a contact surface of an item to which the suction cup 200 is to attach, as seen in FIG. 5.

The releasable adhesive 100 within suction applications should be of a thickness to allow contact with the inside surface of the suction cup 200. Additionally, the thickness of the releasable adhesive 100 should be such that the suction cup 200 may significantly flatten during engagement with the second surface 20. For example, the thickness of the releasable adhesive 100 may be between about 100 µm and about 2.0 mm to prevent introduction of air into the suction cup 200, which may diminish the holding of the suction cup 200.

FIG. 6 illustrates a process for positioning, engaging, and releasing the suction cup 200, including the releasable adhesive 100, from the second surface 20.

At step 230, the suction cup 200 is positioned approximately near the second surface 20. During positioning, the suction cup 200 is placed with the releasable adhesive 100 adjacent the second surface 20 (e.g., the suction cup 200 facing down). The securing device 210 can be used to push the suction cup 200 to the second surface 20 or stabilize the suction cup 200 while the second surface 20 is pushed to the suction cup 200. For example, the securing device 210 can be a mechanical device to push the suction cup 200 to the second surface 20. Alternatively, the securing device 210 can be a vacuum line used to remove air between the inside surface of the suction cup 200 and the second surface 20, thus securing the suction cup 200 to the second surface 20.

At step 240, the suction cup 200 is fully engaged with the second surface 20 (e.g., at least a portion of the suction cup 200 is flat against the second surface 20). During engagement, the inside surface of the suction cup 200, which contains the releasable adhesive 100, is fully engaged or otherwise connected to the second surface 20. In some embodiments, the suction cup 200 may be held in connection with the second surface 20 by a device to enhance holding of the suction cup 200 (e.g., vacuum).

Utilizing the releasable adhesive 100 with the suction cup 200, may enhance holding power of vacuum grippers, for example, when the second surface 20 is subjected to high-speed attachment and placement. Specifically, the releasable adhesive 100 can hold the second surface 20 without vacuum and its restrictions to certain surface texture or geometry conditions. In some circumstances, the gripper may also be used as fail-safe in the event of power or vacuum source failure.

At step 250, the suction cup 200 is released from the second surface 20. The suction cup 200 can be released by using the securing device 210 as a push plunger, for example, to peel the suction cup 200 from the second surface 20. Alternatively, compressed air can be introduced into the inside surface of the suction cup 200 using the securing device 210. When the suction cup 200 is released, the releasable adhesive 100 is separated from the second surface 20.

Additionally, the releasable adhesive 100 may form patterns within the suction cup 200 as seen in FIG. 7. Patterns accommodate general properties (e.g., geometry and texture) and functional properties (e.g., load capacity) of the suction cup 200. Additionally, patterns may increase the holding force in the lateral and/or shear direction, providing resistance to the attaching surface (e.g., the second surface 20). Patterns may include, but are not limited to, a fill cup pattern 262, a radial pattern 264, a ring pattern 266, and a grid pattern 268. One of skill in the art would anticipate other patterns are possible depending on the application.

The full cup pattern 262 may be beneficial where maximum contact of the releasable adhesive 100 is desired to the surface 20. Creating maximum contact may be needed where the releasable adhesive 100 is intended to carry a load near a maximum material constraint of the releasable adhesive 100.

The radial pattern 264 may be beneficial where the first surface 10 inside the suction cup 200 may include radial ribs that increase the stiffness of the suction cup 200. The radial pattern 264 is an effective way to attach the releasable adhesive 100 to the suction cup 200 and enhance its holding or bonding capability. The radial pattern 264 may also provide for a faster release of the suction cup 200 as compared to the frill cup pattern 262, for example, due to less of the releasable adhesive 100 being employed.

An angle 265 can be formed between each of the radii to adequately space the releasable adhesive 100 throughout the suction cup 200. The angle 265 can be the same throughout the radial pattern 264, as seen in FIG. 7. Alternatively, the angle 265 can vary throughout the radial pattern 264.

The ring pattern 266 may also be beneficial where the first surface 10 inside the suction cup 200 has a non-conical geometry (e.g., spherical) that requires a plurality of releasable adhesives 100 (e.g., in the form of narrow rings) to simplify attachment to the suction cup 200 and maintain the maximum contact with the first surface 10. The number of rings can depend on factors such as the amount of release time. For example, the fewer the amount of rings, the faster the suction cup 200 can be released.

Geometric shapes forming the ring pattern 266 can be concentric in nature as seen in FIG. 6 where the concentric geometric shape of the ring pattern 266 is circular. It should be appreciated that the ring pattern 266 can be formed using a number of geometric shapes such as squares, circles, ovals, and triangles, among others.

The grid pattern 268 may be beneficial where a predetermined surface area of the suction cup 200 needs to be covered, but where the full cup pattern 262 is not necessary. The grid pattern 26g can provide for quick attachement of the releasable adhesive 100 to the first surface 10 of the suction cup 200. The grid pattern 268 can be formed using a number of geometric shapes desirable for particular applications such as circles, squares, ovals, and the like. The geometric shaped forming the grid pattern can be independent in nature as seen by as seen in FIG. 6 where the geometric shape of the grid pattern 268 is a square.

In some embodiments, the releasable adhesive 100 may include a plurality of conductive suction cups 200 on an electrically conductive substrate (e.g., metal or conductive polymer). In such an application, the primary material 110 used within the suction cups 200 can include one or more electrically conductive materials as described above.

IV. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A releasable adhesive system, for securing a suction device to an attaching surface, comprising:
   a primary material having a first portion including at least one first-portion molecule configured to be positioned parallel with at least one attaching-surface molecule, and a second portion, opposite the first portion, configured to permanently attach to an interior surface of the suction device, wherein:
   the primary material is shaped into a plurality of components, each component being positioned at a location and extending in a direction outward from the location, forming a plurality of radii from the location, and
   the at least one first-portion molecule, positioned parallel with the attaching-surface molecule, is configured to (a) maintain a bond between the first portion and the attaching surface up to a pre-determined shear force being exerted on the attaching surface and (b) release the bond between the first portion and the attaching surface in response to at least a pre-determined peel force exerted on the attaching surface.

2. The releasable adhesive system of claim 1, wherein a plurality of first-portion molecules contact a plurality of attaching-surface molecules during operation of the releasable adhesive system.

3. The releasable adhesive system of claim 1, wherein each of the plurality of components has (i) the first-portion molecule configured to be positioned parallel with at least attaching-surface molecule and (ii) the second portion configured to permanently attach to the suction device.

4. The releasable adhesive system of claim 1, wherein each of the plurality of radii is positioned at an angle with a preceding radius and a succeeding radius.

5. The releasable adhesive system of claim 1, further comprising a securing device configured to couple to an exterior surface of the suction device forcing contact between the suction device and the attaching surface.

6. The releasable adhesive system of claim 5, wherein air between the interior surface of the suction device and the attaching surface is at least partially removed using the securing device.

7. The releasable adhesive system of claim 6, wherein the securing device includes or creates a vacuum.

8. A releasable adhesive system, for securing a suction device to an attaching surface, comprising:
   a primary material having a first portion including at least one first-portion molecule configured to be positioned parallel with at least one attaching-surface molecule, and a second portion, opposite the first portion, configured to permanently attach to an interior surface of the suction device, wherein:
   the primary material is shaped into a plurality of components shaped to allow concentric positioning of each of the plurality of components with respect to one another, and
   the at least one first-portion molecule, positioned parallel with the attaching-surface molecule, is configured to (a) maintain a bond between the first portion and the attaching surface up to a pre-determined shear force being exerted on the attaching surface and (b) release the bond between the first portion and the attaching surface in response to at least a pre-determined peel force exerted on the attaching surface.

9. The releasable adhesive system of claim 8, wherein a plurality of first-portion molecules contact a plurality of attaching-surface molecules during operation of the releasable adhesive system.

10. The releasable adhesive system of claim 8, wherein each of the plurality of components has (i) the first-portion molecule configured to be positioned parallel with at least attaching-surface molecule and (ii) the second portion configured to permanently attach to the suction device.

11. The releasable adhesive system of claim 8, further comprising a securing device configured to couple to an exterior surface of the suction device forcing contact between the suction device and the attaching surface.

12. The releasable adhesive system of claim 11, wherein air between the interior surface of the suction device and the attaching surface is at least partially removed using the securing device.

13. A method for using a suction device on an attaching surface, comprising:
   positioning a suction device approximately near an attaching surface, the suction device comprising:

a primary material affixed to an interior surface of the suction device, the primary material having a first portion including at least one molecule that is configured to be positioned parallel with at least one molecule of the attaching surface, and a second portion, opposite the first portion, that is configured to permanently attach to the inner surface of the suction device, wherein:

the primary material is shaped into a plurality of components, each component being positioned at a location and extending in a direction outward from the location, forming a plurality of radii from the location, and the molecule of the primary material, positioned parallel with the molecule of the attaching surface, is configured to (a) maintain a bond between the first portion and the attaching surface up to a pre-determined shear force being exerted on the attaching surface and (b) release the bond between the first portion and the attaching surface in response to a pre-determined peel force exerted on the attaching surface; and engaging the first portion with the attaching surface using a securing device, wherein at least a portion of the suction device is approximately flat against the attaching surface.

14. The method of claim 13, wherein the engaging occurs by at least temporarily attaching a securing device to an exterior surface of the suction device forcing contact between the suction device and the attaching surface.

15. The method of claim 14, wherein air between the interior surface of the suction device and the attaching surface is at least partially removed using the securing device.

16. The method of claim 13, wherein the securing device includes or creates a vacuum.

17. The method of claim 13, further comprising releasing the bond between the first portion and the attaching surface using the peel force.

18. The method of claim 13, wherein the releasing occurs by introducing air into the inner surface of the suction device.

19. The method of claim 14, wherein the releasing occurs by exerting a force on a securing device in contact with the attaching surface such that the suction device is released from the attaching surface.

20. The method of claim 15, wherein the releasing device is compressed air provided by a vacuum line.

* * * * *